United States Patent
Nishimura et al.

(10) Patent No.: US 10,843,698 B2
(45) Date of Patent: Nov. 24, 2020

(54) INFORMATION PROCESSING SYSTEM, INFORMATION PROCESSING DEVICE, INFORMATION PROCESSING METHOD, AND NON-TRANSITORY COMPUTER READABLE STORAGE MEDIUM STORING PROGRAM

(71) Applicant: TOYOTA JIDOSHA KABUSHIKI KAISHA, Toyota (JP)

(72) Inventors: Kazuya Nishimura, Okazaki (JP); Yoshihiro Oe, Kawasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 134 days.

(21) Appl. No.: 16/126,602

(22) Filed: Sep. 10, 2018

(65) Prior Publication Data
US 2019/0126932 A1    May 2, 2019

(30) Foreign Application Priority Data
Oct. 26, 2017    (JP) .................................. 2017-207247

(51) Int. Cl.
*B60W 40/09* (2012.01)
*G06Q 40/08* (2012.01)
*B60W 40/04* (2006.01)

(52) U.S. Cl.
CPC ............ *B60W 40/09* (2013.01); *B60W 40/04* (2013.01); *G06Q 40/08* (2013.01); *B60W 2554/80* (2020.02)

(58) Field of Classification Search
CPC .. B60W 40/09; B60W 40/04; B60W 2554/80; G06Q 40/08

USPC ........................................................... 340/439
See application file for complete search history.

(56) References Cited

U.S. PATENT DOCUMENTS

2017/0066374 A1*  3/2017  Hoye ..................... B60W 50/14
2019/0135177 A1*  5/2019  Farrell .................... B60Q 9/00

FOREIGN PATENT DOCUMENTS

| JP | H10-053069 A | 2/1998 |
| JP | 2008-084004 A | 4/2008 |
| JP | 2010-237828 A | 10/2010 |

* cited by examiner

*Primary Examiner* — Joseph H Feild
*Assistant Examiner* — Sharmin Akhter
(74) *Attorney, Agent, or Firm* — Hunton Andrews Kurth LLP

(57) ABSTRACT

An information processing system includes an acquisition unit configured to acquire traveling information indicating traveling conditions of a first vehicle traveling on a road, a determination unit configured to determine one or more driving operations of a driver driving the first vehicle by using the traveling information acquired when a second vehicle approaches the first vehicle, an evaluation unit configured to perform evaluation of safety related to the driver's driving by using determination results of the determination unit, and an updating unit configured to acquire first evaluation results of the evaluation unit during a first predetermined period to compare the first evaluation results with second evaluation results of the evaluation unit during a second predetermined period before the first predetermined period, and to update the second evaluation results based on comparison results.

12 Claims, 13 Drawing Sheets

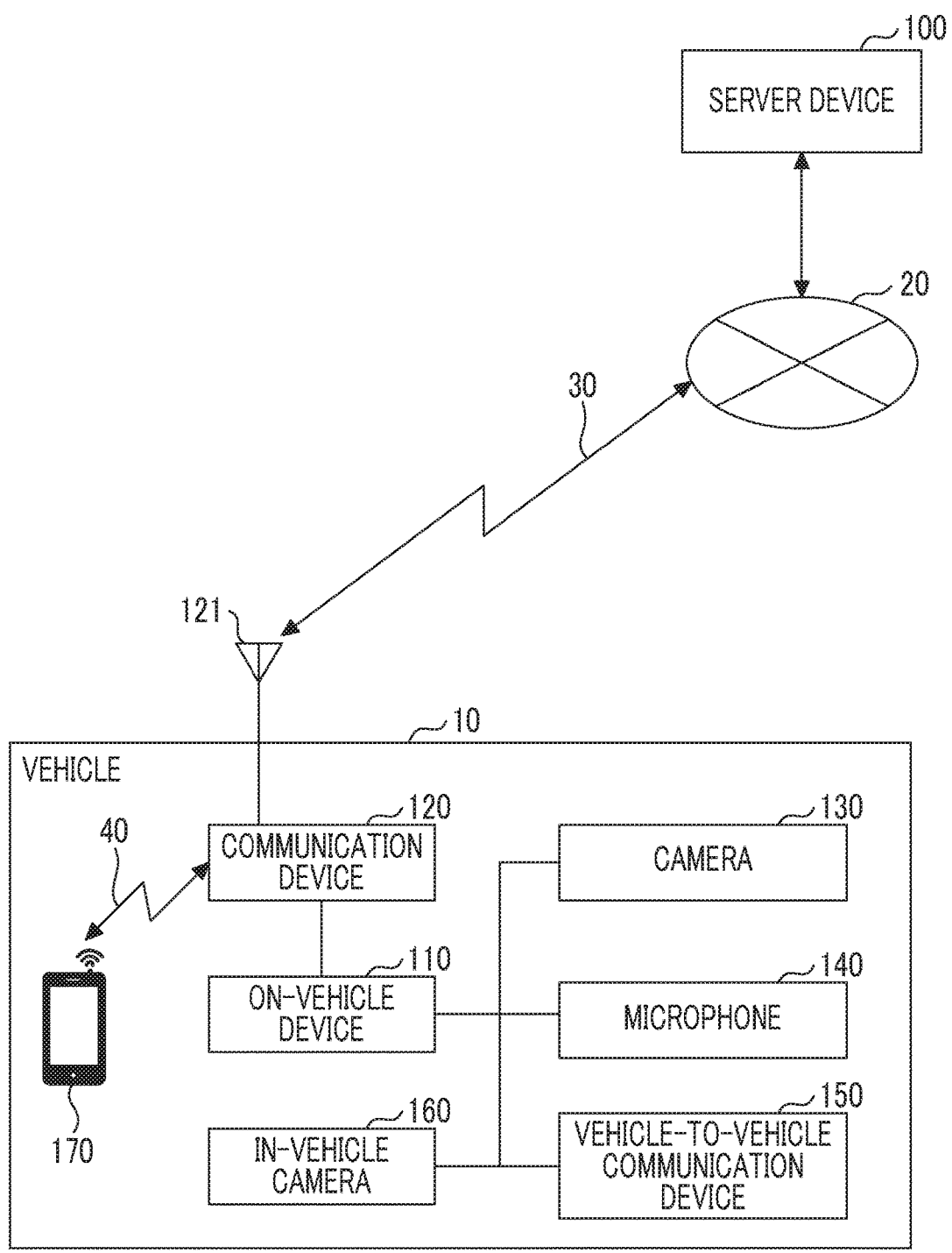

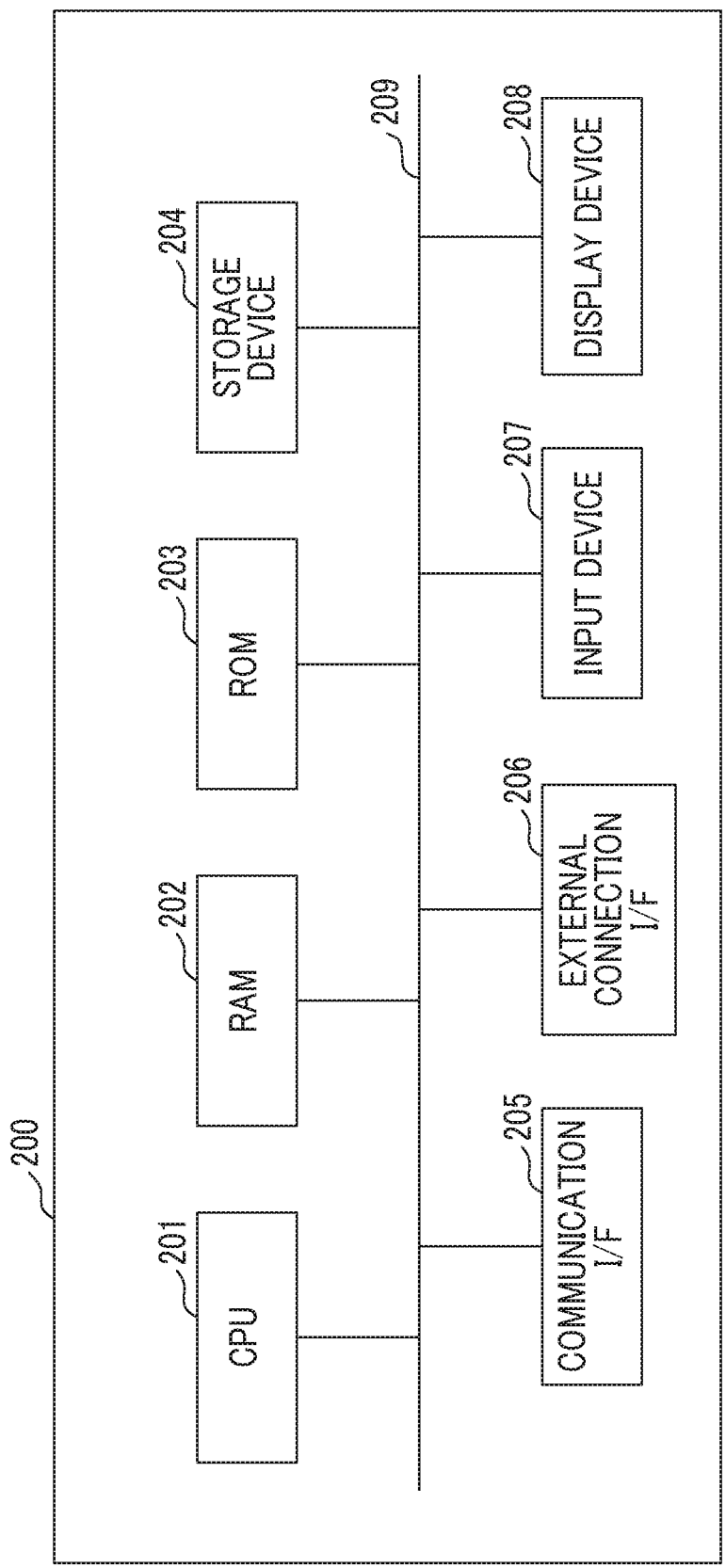

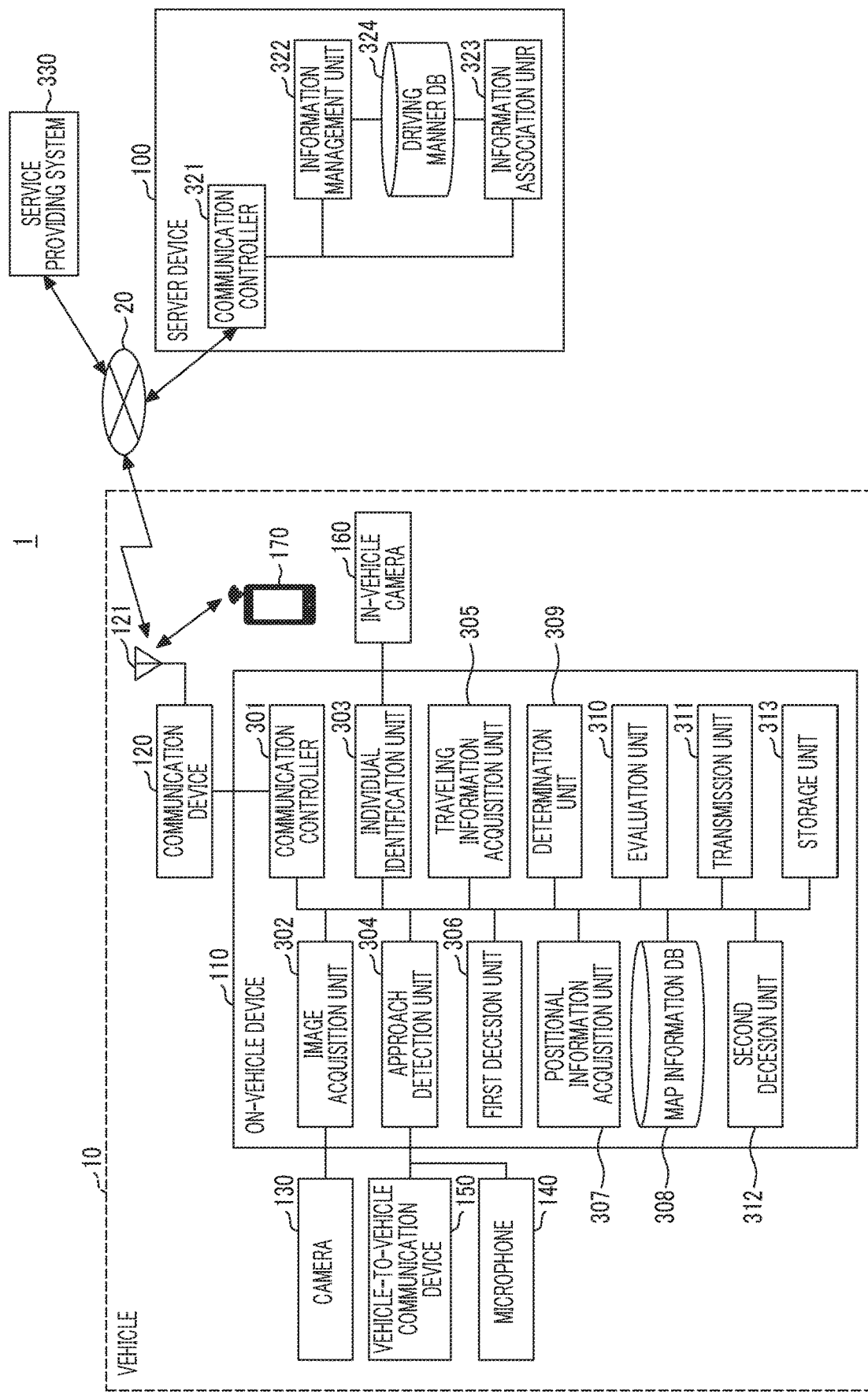

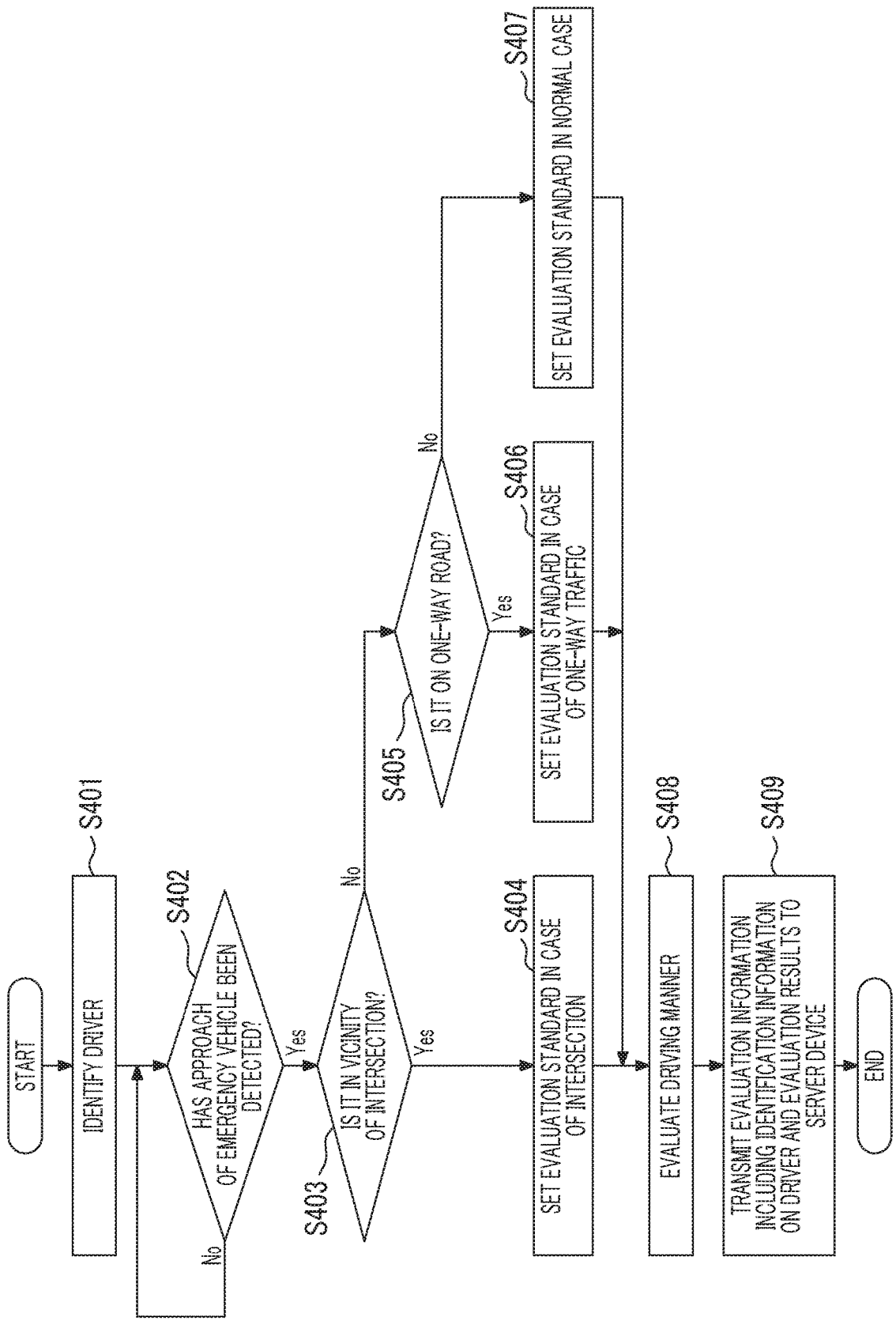

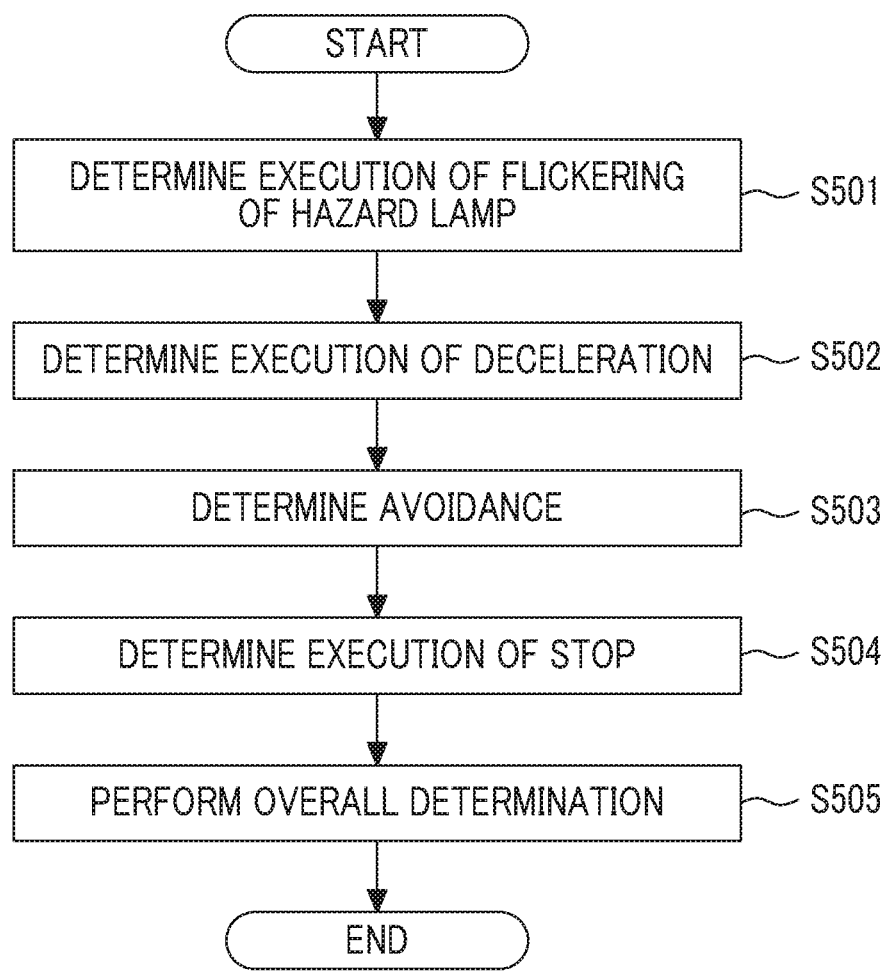

FIG. 6A

| LARGE ITEM | SMALL ITEM | CASE OF INTERSECTION (611) | CASE OF ONE-WAY TRAFFIC (612) | NORMAL CASE (613) |
|---|---|---|---|---|
| FLICKERING OF HAZARD LAMP | EXECUTION OR NON-EXECUTION | - | EXECUTION: +1 | - |
| | | - | NON-EXECUTION: 0 | - |
| DECELERATION | EXECUTION OR NON-EXECUTION | EXECUTION: +1 | | |
| | | NON-EXECUTION: 0 | | |
| AVOIDANCE | EXECUTION OR NON-EXECUTION | EXECUTION: +1 | EXECUTION: +2 | EXECUTION: +2 |
| | | NON-EXECUTION: -1 | NON-EXECUTION: 0 | NON-EXECUTION: -1 |
| | CONTENTS OF EXECUTION | AVOIDANCE WITHIN INTERSECTION: -2 | - | - |
| | | LEFT-JUSTIFIED AVOIDANCE AT FRONT OF INTERSECTION: +1 | - | - |
| STOP | EXECUTION OR NON-EXECUTION | EXECUTION: +1 | | |
| | | NON-EXECUTION: 0 | | |

| LARGE ITEM | SMALL ITEM | CASE OF INTERSECTION | CASE OF ONE-WAY TRAFFIC | NORMAL CASE |
|---|---|---|---|---|
| DECELERATION | EXECUTION OR NON-EXECUTION | EXECUTION: +1 | | |
| | | NON-EXECUTION: 0 | | |
| AVOIDANCE | EXECUTION OR NON-EXECUTION | EXECUTION: +1 | EXECUTION: +2 | EXECUTION: +2 |
| | | NON-EXECUTION: -1 | NON-EXECUTION: 0 | NON-EXECUTION: -1 |
| | CONTENTS OF EXECUTION | AVOIDANCE WITHIN INTERSECTION: -2 | - | - |
| | | LEFT-JUSTIFIED AVOIDANCE AT FRONT OF INTERSECTION: +1 | - | - |
| STOP | EXECUTION OR NON-EXECUTION | EXECUTION: +1 | | |
| | | NON-EXECUTION: 0 | | |

(620)

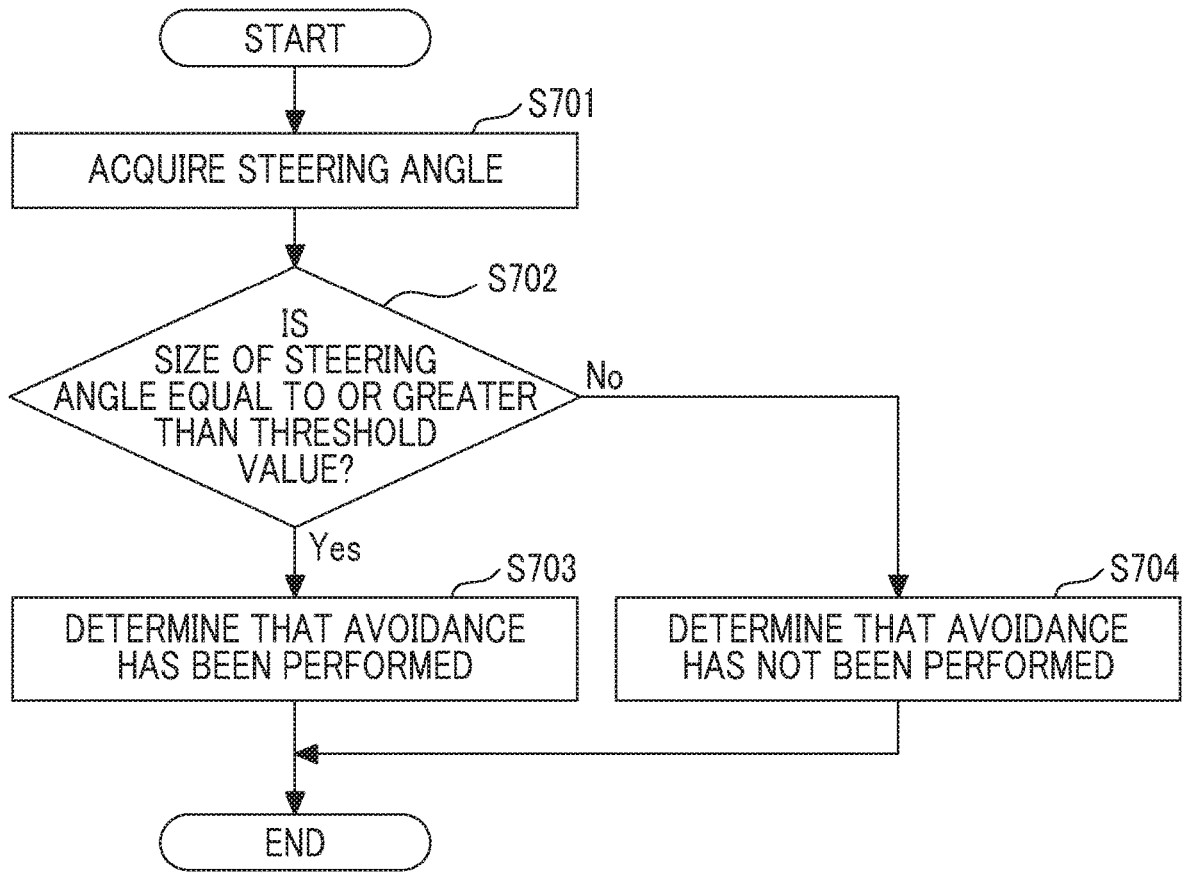

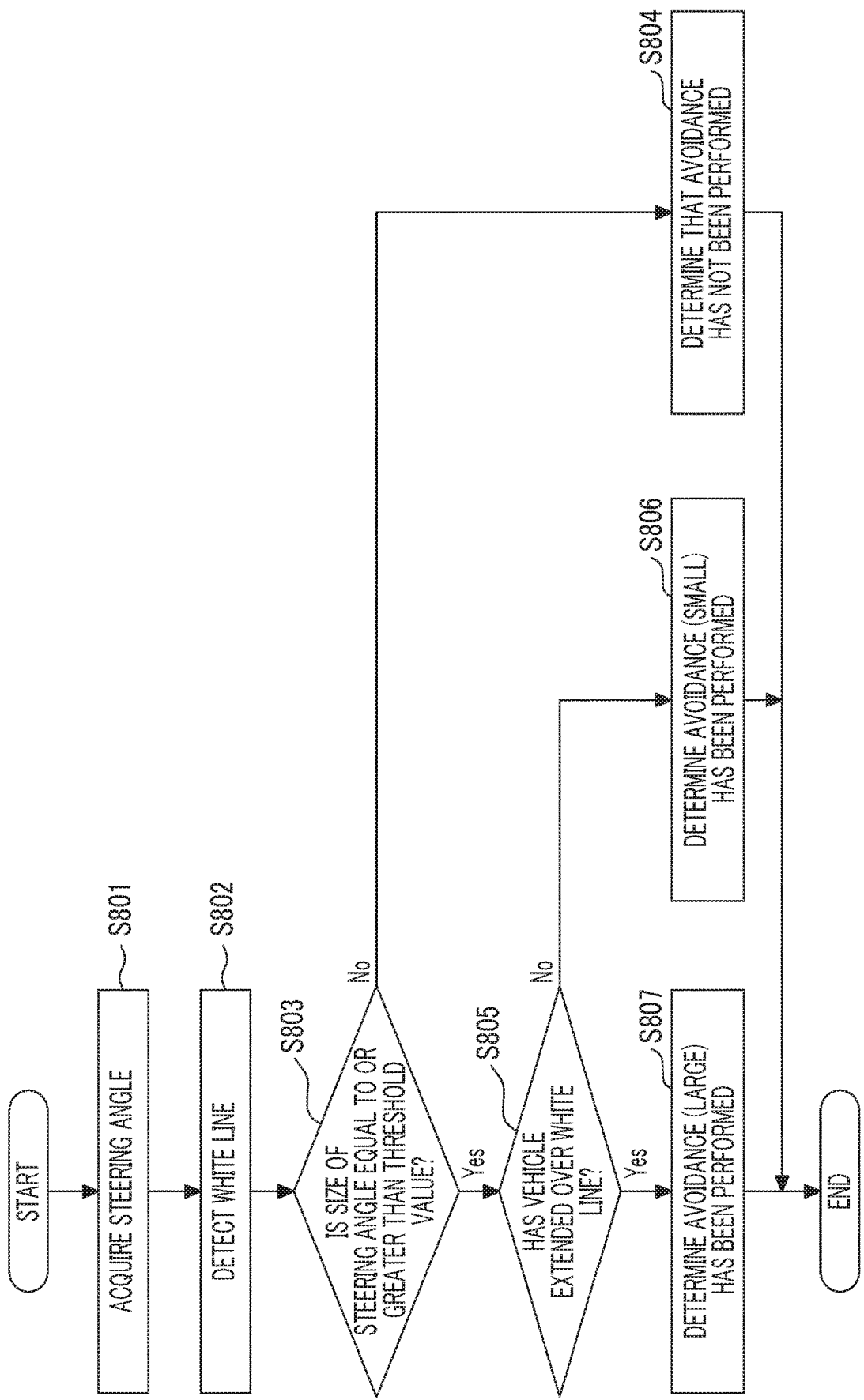

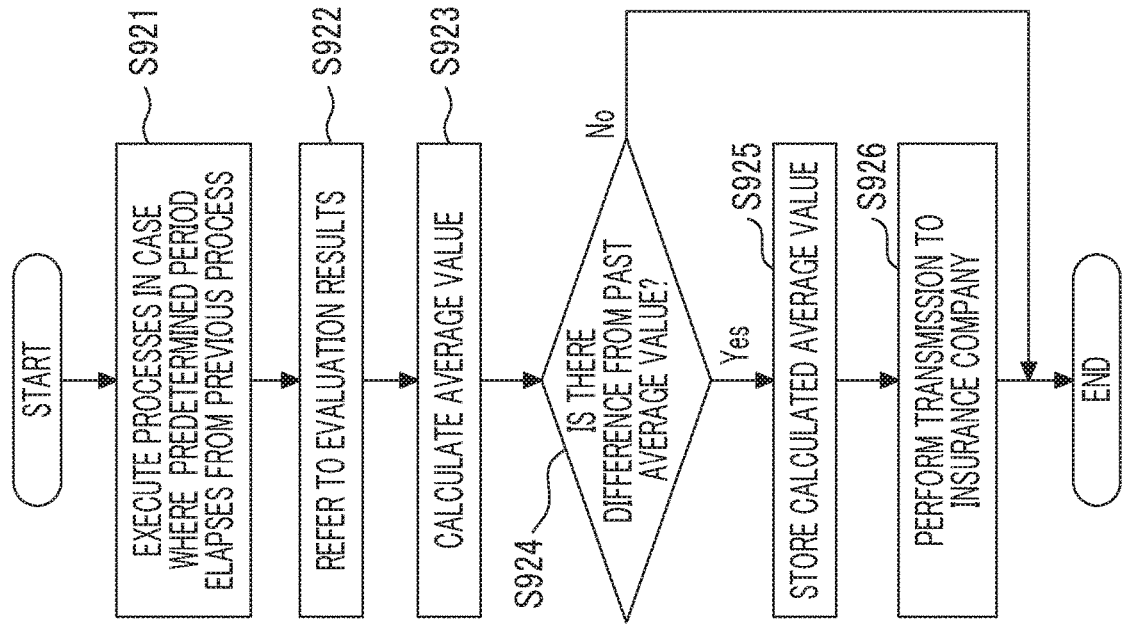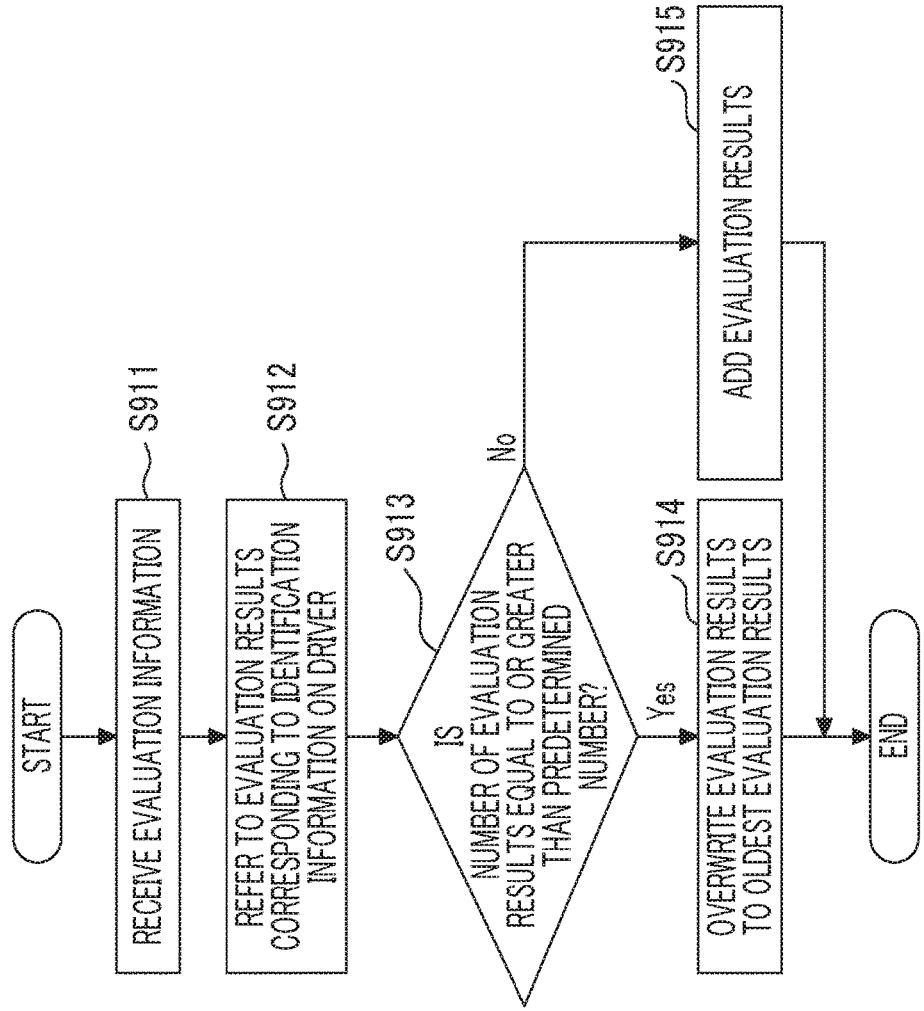

FIG. 11A

| LARGE ITEM | SMALL ITEM | CASE OF INTERSECTION ~1111 | CASE OF ONE-WAY TRAFFIC ~1112 | NORMAL CASE ~1113 |
|---|---|---|---|---|
| FLICKERING OF HAZARD LAMP | EXECUTION OR NON-EXECUTION | EXECUTION: +1 | | |
| | | NON-EXECUTION: 0 | | |
| DECELERATION | EXECUTION OR NON-EXECUTION | EXECUTION: +1 | | |
| | | NON-EXECUTION: 0 | | |
| | TIMING | ONE SECOND OR MORE BEFORE AVOIDANCE: +1 | | |
| | | DURING AVOIDANCE ~ START OF AVOIDANCE ~ ONE SECOND BEFORE, OR NON-EXECUTION: 0 | | |
| AVOIDANCE | EXECUTION OR NON-EXECUTION | EXECUTION: 0 | EXECUTION: +1 | EXECUTION: +2 |
| | | NON-EXECUTION: -1 | NON-EXECUTION: 0 | NON-EXECUTION: -1 |
| | CONTENTS OF EXECUTION | AVOIDANCE WITHIN INTERSECTION: -2 | - | - |
| | | LEFT-JUSTIFIED AVOIDANCE AT FRONT OF INTERSECTION: +1 | - | - |
| STOP | EXECUTION OR NON-EXECUTION | EXECUTION: +1 | | |
| | | NON-EXECUTION: 0 | | |

FIG. 11B

| LARGE ITEM | SMALL ITEM | CASE OF INTERSECTION 1121 | OTHER THAN CASE OF INTERSECTION 1122 |
|---|---|---|---|
| DECELERATION | EXECUTION OR NON-EXECUTION | EXECUTION: +1 ||
| | | NON-EXECUTION: 0 ||
| | TIMING | ONE SECOND OR MORE BEFORE AVOIDANCE: +1 ||
| | | DURING AVOIDANCE ~ START OF AVOIDANCE ~ ONE SECOND BEFORE, OR NON-EXECUTION: 0 ||
| AVOIDANCE | EXECUTION OR NON-EXECUTION | EXECUTION: +1 | EXECUTION: +2 |
| | | NON-EXECUTION: -1 | NON-EXECUTION: -1 |
| | CONTENTS OF EXECUTION | AVOIDANCE WITHIN INTERSECTION: -2 | - |
| | | LEFT-JUSTIFIED AVOIDANCE AT FRONT OF INTERSECTION: +1 | - |
| STOP | EXECUTION OR NON-EXECUTION | EXECUTION: +1 ||
| | | NON-EXECUTION: 0 ||

1120

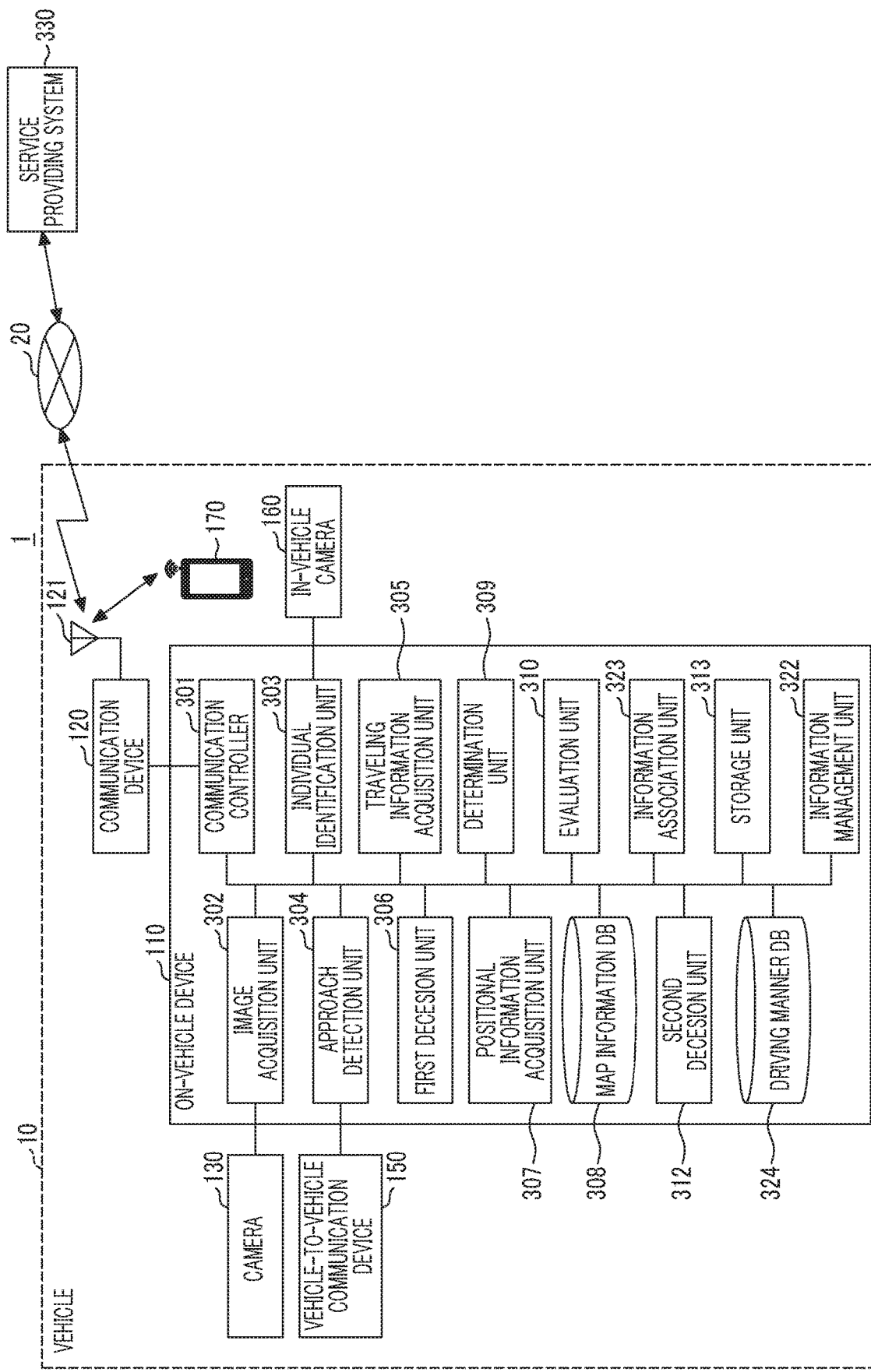

INFORMATION PROCESSING SYSTEM, INFORMATION PROCESSING DEVICE, INFORMATION PROCESSING METHOD, AND NON-TRANSITORY COMPUTER READABLE STORAGE MEDIUM STORING PROGRAM

INCORPORATION BY REFERENCE

The disclosure of Japanese Patent Application No. 2017-207247 filed on Oct. 26, 2017 including the specification, drawings and abstract is incorporated herein by reference in its entirety.

BACKGROUND

1. Technical Field

The present disclosure relates to an information processing system, an information processing device, an information processing method, and a non-transitory computer readable storage medium storing a program.

2. Description of Related Art

There has been known an information processing system that evaluates the safety (for example, a driving manner or the like) of driving of a driver who drives a vehicle such as an automobile.

For example, there has been known a vehicle operation diagnosis device that calculates a ratio of the number of times of deceleration and the number of times of stop of a host vehicle during the traveling of the host vehicle to the number of times that the host vehicle gives way to another vehicle and evaluates the safety of driving of a driver based on the calculated ratio (for example, Japanese Unexamined Patent Application Publication No. 2010-237828 (JP 2010-237828 A)).

SUMMARY

In the technique disclosed in JP 2010-237828 A, the safety of a driving operation of the vehicle is evaluated in a period between the start to the end of traveling of the vehicle, and, for example, it may not be said that it is sufficient to decide the safety of a driver's driving.

For example, in a case where an insurance company or the like providing automobile insurance to a driver gives an incentive, such as a discount of an insurance bill, in accordance with the safety of the driver's driving, it is difficult to appropriately evaluate the safety of the driver's driving by solely evaluation results based on the technique disclosed in JP 2010-237828 A.

The disclosure is provided to be capable of appropriately deciding the safety of a driver's driving in an information processing system that evaluates the safety of driving of a driver (hereinafter, also simply referred to as a "driver") who drives a vehicle such as an automobile.

A first aspect of the disclosure relates to an information processing system including an acquisition unit, a determination unit, an evaluation unit, and an updating unit. The acquisition unit is configured to acquire traveling information indicating traveling conditions of a first vehicle traveling on a road. The determination unit is configured to to determine one or more driving operations of a driver driving the first vehicle by using the traveling information acquired when a second vehicle approaches the first vehicle. The evaluation unit is configured to perform evaluation of safety related to the driver's driving by using determination results of the determination unit. The updating unit is configured to acquire first evaluation results of the evaluation unit during a first predetermined period to compare the first evaluation results with second evaluation results of the evaluation unit during a second predetermined period before the first predetermined period, and to update the second evaluation results based on comparison results.

According to the first aspect of the disclosure, the information processing system acquires the first evaluation results which are evaluation results on safety based on the driver's driving operation during a predetermined period (for example, several months or the like). Therefore, for example, it is also possible to appropriately decide the safety of a driving operation with respect to an event, such as a driving operation when an emergency vehicle approaches, which has a relatively low frequency of occurrence. According to the first aspect of the disclosure, the information processing system compares the acquired first evaluation results with the second evaluation results which are the past evaluation results, for example, for each predetermined period to update the second evaluation results, and thus it is possible to hold the latest evaluation results at all times. Therefore, according to the first aspect of the disclosure, the information processing system can appropriately decide the safety of driving of the driver who drives a vehicle such as an automobile.

In the information processing system according to the first aspect of the disclosure, the updating unit may update the second evaluation results by an average value of the first evaluation results when there is a difference between the average value of the first evaluation results and the second evaluation results.

According to the first aspect of the disclosure, the information processing system can maintain evaluation results on the safety related to the driver's driving in the latest state, and can reduce a load of updating processing of the updating unit in a case where there is no difference between the first evaluation results and the second evaluation results.

The information processing system according to the first aspect of the disclosure may further include an individual identification unit configured to identify the driver, and an information association unit configured to transmit the second evaluation results updated by the updating unit and information for identifying the driver to a service providing system that provides a predetermined service to the driver.

According to the first aspect of the disclosure, the information processing system can associate the evaluation results on safety related to the driver's driving with the service providing system that provides a predetermined service to the driver.

In the information processing system according to the first aspect of the disclosure, the second vehicle may include an emergency vehicle. The evaluation results of the evaluation unit may include evaluation of a driving manner when the emergency vehicle approaches the first vehicle.

According to the first aspect of the disclosure, the information processing system can appropriately decide safety related to the driver's driving by using the evaluation results on safety related to the driver's driving which include evaluation of a driving manner when the emergency vehicle approaches the first vehicle.

In the information processing system according to the first aspect of the disclosure, the traveling information may include information on the first vehicle according to the driver's driving operation, or image data obtained by imaging a vicinity of the first vehicle. The one or more driving operations may include flickering of a hazard lamp, deceleration, avoidance, or stop of the first vehicle. The evaluation unit may perform evaluation of safety related to the driver's driving in accordance with whether the driver executes the one or more driving operations, when the second vehicle approaches the first vehicle.

According to the first aspect of the disclosure, the information processing system can decide flickering of a hazard lamp, deceleration, avoidance, or stop of the vehicle which is performed by the driver when the second vehicle approaches the first vehicle, and can appropriately decide safety related to the driver's driving in accordance with whether or not the driver observes a predetermined rule.

The information processing system according to the first aspect of the disclosure may further include a positional information acquisition unit configured to acquire positional information indicating a position of the first vehicle, and a first decision unit configured to decide whether or not a point where the first vehicle is traveling is in a vicinity of an intersection and whether the point is on a one-way road, by using the positional information of the first vehicle and map information of the road. The evaluation unit may perform evaluation of safety related to the driver's driving by using evaluation standards varying depending on decision results of the first decision unit.

According to the first aspect of the disclosure, the information processing system can perform evaluation of safety related to the driver's driving according to different standards for determination depending on a point where the first vehicle is traveling, and thus it is possible to appropriately decide safety related to the driver's driving.

The information processing system according to the first aspect of the disclosure may further include a second decision unit configured to decide whether the second vehicle is traveling on the same lane as that of the first vehicle or is traveling on a lane different from that of the first vehicle by using image data obtained by imaging a vicinity of the first vehicle. The evaluation unit may perform evaluation of safety related to the driver's driving by using evaluation standards varying depending on decision results of the second decision unit.

According to the first aspect of the disclosure, the information processing system can perform evaluation of safety related to the driver's driving according to different standards for determination depending on a lane on which the second vehicle is traveling, and thus it is possible to appropriately decide safety related to the driver's driving.

In the information processing system according to the first aspect of the disclosure, the information processing system may include an on-vehicle device mounted on the first vehicle, and the on-vehicle device may include the acquisition unit, the determination unit, the evaluation unit, and a transmission unit that transmits evaluation information including evaluation results of the evaluation unit and information for identifying the driver to an information processing device including the updating unit.

According to the first aspect of the disclosure, the information processing system can efficiently execute processing by distributing a load of updating processing of the updating unit to the on-vehicle device mounted on the first vehicle and the information processing device including the updating unit.

The information processing system according to the first aspect of the disclosure may further include a server device configured to communicate with an on-vehicle device mounted on the first vehicle. The server device may include a receiver that receives evaluation information including evaluation results of the evaluation unit and information for identifying the driver, the updating unit, and an information association unit that transmits (i) the evaluation results on safety related to the driver's driving which are updated by the updating unit, and (ii) the information for identifying the driver to a service providing system that provides a predetermined service to the driver.

According to the first aspect of the disclosure, the information processing system can store the evaluation results on safety related to the driver's driving in the information processing device and can utilize the evaluation results, and thus it is possible to reduce a load and a storage capacity of the on-vehicle device.

In the information processing system according to the first aspect of the disclosure, the evaluation unit may add a score in accordance with predetermined evaluation standards in accordance with at least one of (i) whether or not the driver of the vehicle causes a hazard lamp to flicker, (ii) whether or not the vehicle decelerates, (iii) whether or not avoidance is appropriate, and (iv) whether or not the vehicle stops, to calculate evaluation on safety related to the driver's driving as an evaluation score.

A second aspect of the disclosure relates to an information processing device. The information processing device includes an acquisition unit configured to acquire traveling information indicating traveling conditions of a first vehicle traveling on a road, a determination unit configured to determine one or more driving operations of a driver driving the first vehicle by using the traveling information acquired when a second vehicle approaches the first vehicle, an evaluation unit configured to perform evaluation of safety related to the driver's driving by using determination results of the determination unit, and an updating unit configured to acquire first evaluation results of the evaluation unit during a first predetermined period to compare the first evaluation results with second evaluation results of the evaluation unit during a second predetermined period before the first predetermined period, and updates the second evaluation results based on comparison results.

A third aspect of the disclosure relates to an information processing method. The information processing method includes, by a computer, acquiring traveling information indicating traveling conditions of a first vehicle traveling on a road, determining one or more driving operations of a driver driving the first vehicle by using the traveling information acquired when a second vehicle approaches the first vehicle, evaluating safety related to the driver's driving by using determination results obtained in the determination, and acquiring first evaluation results obtained in the evaluation during a first predetermined period, to compare the first evaluation results with second evaluation results obtained in the evaluation during a second predetermined period before the first predetermined period, and updating the second evaluation results based on comparison results.

A fourth aspect of the disclosure relates to a non-transitory computer readable storage medium storing a program for causing a computer to execute the information processing method.

According to the aspects of the disclosure, it is possible to appropriately decide safety related to the driver's driving in the information processing system that evaluates safety related to the driving of the driver who drives a vehicle such as an automobile.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 1 is a diagram illustrating an example of a system configuration of an information processing system according to a first embodiment;

FIG. 2 is a diagram illustrating an example of a hardware configuration of a computer according to the first embodiment;

FIG. 3 is a diagram illustrating an example of a functional configuration of the information processing system according to the first embodiment;

FIG. 4 is a flowchart illustrating an example of processing of an on-vehicle device according to the first embodiment;

FIG. 5 is a flowchart illustrating an example of a driving manner evaluation process according to the first embodiment;

FIG. 6A is a diagram illustrating an example of an evaluation standard according to the first embodiment;

FIG. 6B is a diagram illustrating an example of an evaluation standard according to the first embodiment;

FIG. 7 is a flowchart illustrating an example of avoidance determination processing according to the first embodiment;

FIG. 8 is a flowchart illustrating another example of avoidance determination processing according to the first embodiment;

FIG. 9A is a flowchart illustrating an example of processing of a server device according to the first embodiment;

FIG. 9B is a flowchart illustrating an example of processing of the server device according to the first embodiment;

FIG. 11A is a diagram illustrating an example of an evaluation standard according to the second embodiment;

FIG. 11B is a diagram illustrating an example of an evaluation standard according to the second embodiment; and FIG. 12 is a diagram illustrating another example of a functional configuration of the information processing system according to the first embodiment.

DETAILED DESCRIPTION OF EMBODIMENTS

Figure 10:
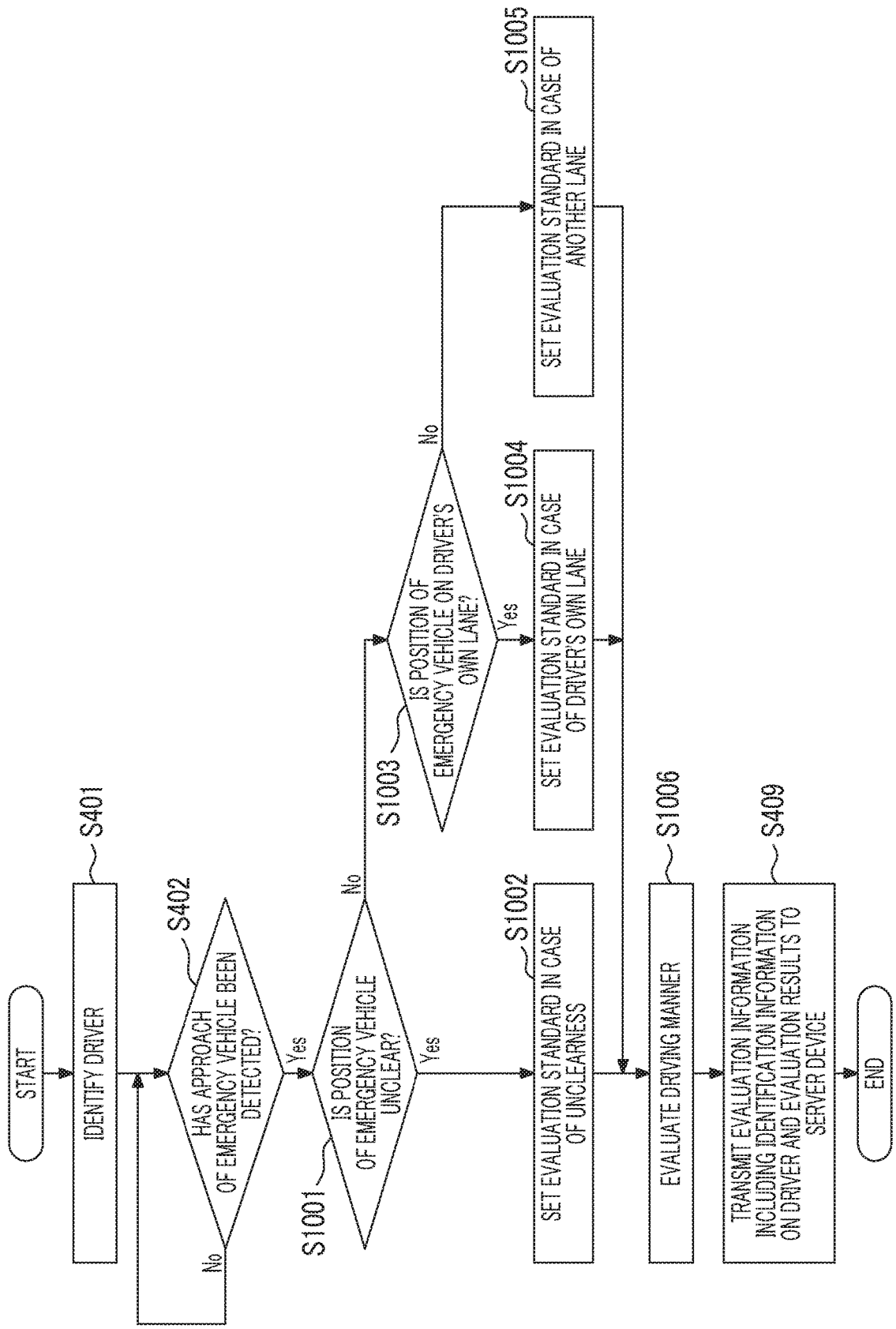
FIG. 10 is a flowchart illustrating an example of processing of an on-vehicle device according to a second embodiment.

Hereinafter, embodiments will be described with reference to the accompanying drawings.

System Configuration

FIG. 1 is a diagram illustrating an example of a system configuration of an information processing system according to a first embodiment. An information processing system 1 includes an on-vehicle device 110 which is mounted on a vehicle (first vehicle) 10 such as an automobile, and a server device 100 connected to a communication network 20.

In FIG. 1, the on-vehicle device 110 is connected to the communication network 20 by using a communication device 120 mounted on the vehicle 10, and is capable of communicating with the server device 100 through the communication network 20. Here, the communication device 120 is a device for connection to the communication network 20 through wireless communication, and is realized by, for example, a Data Communication Module (DCM) or the like.

The on-vehicle device 110 is an information apparatus, such as a car navigation device, or an information processing device, such as an on-vehicle Electronic Control Unit (ECU), which is mounted on the vehicle 10.

The on-vehicle device 110 can acquire image data obtained by imaging the vicinity of the vehicle 10 by using a camera 130 mounted on the vehicle 10. Desirably, the on-vehicle device 110 can acquire sound data collected from the vicinity of the vehicle 10 by using a microphone 140 mounted on the vehicle 10. As an example, the on-vehicle device 110 detects that an emergency vehicle (an example of a second vehicle) has approached the vehicle 10 by using the image data obtained by the imaging of the camera 130, the sound data acquired by the microphone 140, or the like. As another example, the on-vehicle device 110 may detect that the emergency vehicle has approached the vehicle 10 by using a vehicle-to-vehicle communication device 150 communicating with another vehicle, or the like.

The emergency vehicle is an example of a second vehicle for the on-vehicle device 110 to detect approach to the vehicle 10. The second vehicle may be another vehicle, such as a bus traveling on a bus priority lane, which has a higher degree of priority of the use of a road than the vehicle 10.

The on-vehicle device 110 can acquire vehicle information, such as the speed, steering angle, and acceleration of the vehicle 10 and the flickering of a hazard lamp, from the vehicle control ECU controlling the vehicle 10, or the like. The vehicle information is an example of traveling information indicating traveling conditions of the vehicle 10. The traveling information may be, for example, information indicating traveling conditions of the vehicle 10, or the like which is acquired by analyzing the image data, which is obtained by the imaging of the camera 130, by the on-vehicle device 110.

Desirably, the on-vehicle device 110 can identify the driver who drives the vehicle 10 by image authentication based on an image of the driver which is captured by an in-vehicle camera 160, belonging authentication using an information terminal 170 or the like owned by the driver, or the like.

With the above-described configuration, the on-vehicle device 110 determines one or more driving operations (the flickering of a hazard lamp, deceleration, avoidance, stop, and the like) of the driver of the vehicle 10 by using the traveling information indicating traveling conditions of the vehicle 10 when, for example, an emergency vehicle approaches the vehicle 10 traveling on the road. For example, in the driving operations, the avoidance includes an operation of changing the course of the vehicle 10 in order to give way to the emergency vehicle, and the like.

The on-vehicle device 110 performs the evaluation (for example, the evaluation of a driving manner) of safety related to the driving of the driver of the vehicle 10 by using determination results of the driving operation performed by the driver of the vehicle 10.

The on-vehicle device 110 transmits evaluation information including identification information for identifying the driver of the vehicle 10 and evaluation results on safety related to the driver's driving to the server device 100 by using the communication device 120.

The server device (information processing device) 100 is an information processing device such as a Personal Computer (PC), or a system including a plurality of information processing devices. The server device 100 receives the evaluation information transmitted from the on-vehicle device 110, and stores the evaluation results on safety related to the driver's driving in a predetermined period, for example, in a driving manner Data Base (DB) to be described later, or the like to manage the evaluation results.

The server device 100 acquires the evaluation results of the driver in the predetermined period which are stored in the driving manner DB or the like, compares the acquired evaluation results with evaluation results of the driver before the predetermined period, and updates the evaluation results of the driver based on comparison results.

Desirably, the server device 100 transmits the updated evaluation results to a service providing system, such as an insurance company, which provides an insurance service (an example of a predetermined service) to the driver, in a case where the evaluation results of the driver are updated.

With the above-described configuration, the information processing system 1 acquires the evaluation results on safety based on the driver's driving operation in a predetermined period (for example, several months or the like). Therefore, it is also possible to appropriately decide the safety of a driving operation with respect to an event, such as a driving operation when an emergency vehicle approaches, which has a relatively low frequency of occurrence. The information processing system 1 compares the acquired evaluation results with past evaluation results, for example, for each predetermined period to update the past evaluation results based on the comparison results, and thus it is possible to hold the latest evaluation results at all times. Therefore, according to the information processing system 1 of the embodiment, it is possible to appropriately decide the safety of driving of the driver who drives a vehicle such as an automobile.

Therefore, according to the information processing system 1 of the embodiment, it is possible to appropriately decide the safety of driving of the driver who drives a vehicle such as an automobile.

Hardware Configuration

On-Vehicle Device, and Hardware Configuration of Server Device

The on-vehicle device 110 and the server device 100 are information processing devices having a configuration of a general computer, and thus a hardware configuration of a general computer will be described here.

FIG. 2 is a diagram illustrating an example of a hardware configuration of a computer according to the first embodiment. A computer 200 includes, for example, a Central Processing Unit (CPU) 201, a Random Access Memory (RAM) 202, a Read Only Memory (ROM) 203, a storage device 204, a communication interface (I/F) 205, an external connection I/F 206, an input device 207, a display device 208, a system bus 209, and the like.

The CPU 201 is a computational device that reads out programs, data, or the like stored in the ROM 203, the storage device 204, or the like on the RAM 202 and executes processing to realize functions of the computer 200. The RAM 202 is a volatile memory which is used as a work area of the CPU 201, or the like. The ROM 203 is a non-volatile memory that holds the programs and the data even when a power source is turned off. The storage device 204 is a storage device such as a Hard Disk Drive (HDD) or a Solid State Drive (SSD), and stores, for example, an Operation System (OS), programs, various data, and the like.

The communication I/F 205 is an interface for communication of the computer 200 with another information processing device or the like. For example, in a case where the computer 200 is the server device 100, the communication I/F 205 is a network interface such as a wired or wireless Local Area Network (LAN). In a case where the computer 200 is the on-vehicle device 110, the communication I/F 205 is a communication interface such as a Controller Area Network (CAN) for communication with, for example, the on-vehicle ECU mounted on the vehicle 10, the communication device 120, or the like.

The external connection I/F 206 is an interface for connecting an external device to the computer 200. The external apparatus includes, for example, a recording medium and the like. In a case where the computer 200 is the on-vehicle device 110, the external apparatus may also include the camera 130, the microphone 140, the vehicle-to-vehicle communication device 150, the in-vehicle camera 160, and the like.

The input device 207 is an input device such as a keyboard, a touch panel, or an operation button for receiving a user's input operation. The display device 208 is a display device for displaying processing results of the computer 200, and the like. The system bus 209 is connected to the above-described components in common, and transmits, for example, an address signal, a data signal, various control signals, and the like.

FIG. 2 illustrates an example of a hardware configuration of the computer 200, and the computer 200 may not include, for example, the input device 207, the display device 208, and the like.

Functional Configuration

A functional configuration of the information processing system 1 will be described. FIG. 3 is a diagram illustrating an example of the functional configuration of the information processing system according to the first embodiment.

Functional Configuration of On-Vehicle Device

The on-vehicle device 110 includes, for example, a communication controller 301, an image acquisition unit 302, an individual identification unit 303, an approach detection unit 304, a traveling information acquisition unit 305, a first decision unit 306, a positional information acquisition unit 307, a map information DB 308, a determination unit 309, an evaluation unit 310, a transmission unit 311, a second decision unit 312, a storage unit 313, and the like.

The on-vehicle device 110 executes the program stored in a recording medium, such as the ROM 203 or the storage device 204, for example, by the CPU 201 to thereby realize the above-described functional configurations. At least some of the above-described functional configurations may be realized by hardware.

The communication controller 301 is realized by, for example, the program executed by the CPU 201, and connects the on-vehicle device 110 to the communication network 20 by using the communication device 120 to perform communication with the server device 100 or the like. The communication device 120 is a wireless communication device, a wireless communication module, or the like which performs wireless communication by using one or more antennas 121 included in the vehicle 10 or the communication device 120 under the control of the communication controller 301.

The communication controller 301 may have a function of performing wireless communication with the information terminal 170 owned by the driver of the vehicle 10, or the like by using the communication device 120 or the like.

The image acquisition unit 302 is realized by, for example, the program executed by the CPU 201, and acquires image data (for example, moving image data, or one or more pieces of still image data) which is obtained by imaging the vicinity of the vehicle 10 by using the camera 130.

The individual identification unit 303 is realized by, for example, the program executed by the CPU 201, and identifies the driver of the vehicle 10 by face image authentication based on a face image of the driver of the vehicle 10 which is captured by the in-vehicle camera 160, communication with the information terminal 170 owned by the driver, or the like.

The approach detection unit 304 is realized by, for example, the program executed by the CPU 201, and analyzes image data of the vicinity of the vehicle 10 which is acquired by the image acquisition unit 302 or sound data of the vicinity of the vehicle 10 which is acquired from the microphone 140 to detect the approach of an emergency vehicle (an example of a second vehicle). As another example, the approach detection unit 304 may detect the approach of the emergency vehicle by using vehicle information which is received by the vehicle-to-vehicle communication device 150 from another vehicle traveling in the vicinity of the vehicle 10.

The traveling information acquisition unit (acquisition unit) 305 is realized by, for example, the program executed by the CPU 201, and acquires traveling information indicating traveling conditions of the vehicle 10 traveling on a road. For example, the traveling information acquisition unit 305 acquires vehicle information of the vehicle 10 based on a driving operation of the driver, such as the speed, acceleration, and steering angle of the vehicle 10 and whether or not a hazard lamp flickers, from the vehicle control ECU controlling the vehicle 10, or the like.

The traveling information acquisition unit 305 may analyze the image data obtained by imaging the vicinity of the vehicle 10 and acquired by the image acquisition unit 302, in addition to the vehicle information of the vehicle 10 (or instead of the vehicle information) to acquire information indicating traveling conditions of the vehicle 10.

The first decision unit 306 is realized by, for example, the program executed by the CPU 201, and decides whether or not a point where the vehicle 10 is traveling is in the vicinity of an intersection and whether the point is on a one-way road. For example, the first decision unit 306 decides whether or not a point where the vehicle 10 is traveling is in the vicinity of an intersection and whether the point is on a one-way road, by using positional information indicating the position of the vehicle 10 which is acquired by the positional information acquisition unit 307 and map information which is stored in the map information DB 308 in advance.

The positional information acquisition unit 307 is realized by, for example, the program executed by the CPU 201, and acquires positional information indicating the position of the vehicle 10. For example, the positional information acquisition unit 307 calculates positional information of the vehicle 10 by using position data acquired from a Global Positioning System (GPS) receiver, or the like, vehicle information of the vehicle 10, or the like.

The positional information acquisition unit 307 may acquire position coordinates indicating the position of the vehicle 10 from a car navigation device mounted on the vehicle 10, or the like.

The map information DB 308 is realized by, for example, the program executed by the CPU 201, the storage device 204, or the like, and stores map information including information on an intersection and one-way traffic in advance.

The determination unit 309 is realized by, for example, the program executed by the CPU 201, and determines one or more driving operations of the driver when an emergency vehicle has approached the vehicle 10, by using the traveling information acquired by the traveling information acquisition unit 305. For example, when the approach detection unit 304 detects the approach of the emergency vehicle, the determination unit 309 determines the flickering of the hazard lamp, deceleration, avoidance, stop, or the like has been executed, execution contents, and the like, by using the traveling information acquired by the traveling information acquisition unit 305.

The evaluation unit 310 is realized by, for example, the program executed by the CPU 201, and performs the evaluation of safety related to the driving of the driver of the vehicle 10 by using determination results obtained by the determination unit 309. For example, the evaluation unit 310 adds a score in accordance with a predetermined evaluation standard based on whether or not the driver of the vehicle 10 causes a hazard, where or not the vehicle decelerates, whether or not avoidance is appropriate, whether or not the vehicle stops, or the like when an emergency vehicle approaches the vehicle 10, to calculate an evaluation score. The evaluation results on the safety related to the driver's driving include, for example, the evaluation of a driving manner when the emergency vehicle approaches the vehicle 10, and the like.

The transmission unit 311 is realized by, for example, the program executed by the CPU 201, and transmits evaluation information including information for identifying the driver of the vehicle 10 (identification information) and evaluation results obtained by the evaluation unit 310 to the server device 100.

The second decision unit 312 is realized by, for example, the program executed by the CPU 201. The second decision unit 312 analyzes image data acquired by the image acquisition unit 302 to decide whether or not the emergency vehicle detected by the approach detection unit 304 is traveling on the same lane as that of the vehicle 10 and is traveling on a lane different from the vehicle 10.

The storage unit 313 is realized by, for example, the program executed by the CPU 201, the RAM 202, the storage device 204, and the like, and stores various information including an evaluation standard used by the evaluation unit 310.

Functional Configuration of Server Device

The server device 100 includes, for example, a communication controller 321, an information management unit 322, an information association unit 323, a driving manner DB 324, and the like.

The server device 100 realizes the above-described functional configurations by, for example, the program executed by the CPU 201 (or programs executed by a plurality of computers 200).

The communication controller 321 is realized by, for example, the program executed by the CPU 201. The communication controller 321 connects the server device 100 to the communication network 20 by using, for example, the communication I/F 205, and communicates with the on-vehicle device 110, the service providing system 330, and the like. The communication controller 321 functions as a receiver that receives evaluation information including the evaluation results obtained by the evaluation unit 310 and transmitted from the on-vehicle device 110 and information for identifying the driver driving the vehicle 10.

The information management unit (updating unit) 322 is realized by, for example, the program executed by the CPU 201, and stores the identification information on the driver and the evaluation results on the driver, which are included in the evaluation information transmitted from the on-vehicle device 110, in the driving manner DB 324 in association with each other to manage the identification information and the evaluation results. Desirably, the information management unit 322 stores a predetermined number of pieces of information included in the latest evaluation information, among pieces of evaluation information received within a predetermined period, in the driving manner DB 324.

The information management unit 322 functions as an updating unit that acquires evaluation results (first evaluation results) on the driver in a first predetermined period to compare the acquired evaluation results with evaluation results (second evaluation results) on the driver in a second predetermined period before the first predetermined period, and updates the past evaluation results on the driver based on comparison results. For example, the information management unit 322 updates the past evaluation results by the evaluation results on the driver in the first predetermined period in a case where there is a difference between the first evaluation results and the second evaluation results.

The information association unit 323 is realized by, for example, the program executed by the CPU 201, and transmits the evaluation results on the driver which are updated by the information management unit 322 to the service providing system 330 and the like together with the identification information on the driver. As described above, the information association unit 323 can associate the evaluation results on the driver with a predetermined service to be provided to the driver by the service providing system 330.

Here, the service providing system 330 is a system that provides a predetermined service to the driver of the vehicle 10 by using the evaluation results (a driving manner and the like) on the driving of the driver of the vehicle 10. For example, the service providing system 330 is a system related to an insurance company providing an automobile insurance to the driver, and can give an incentive, such as a discount of an insurance bill, to a driver having favorable evaluation results on a driving manner.

Flow of Processing

A flow of processing of an information processing method according to an embodiment will be described.

First Embodiment

Processing of On-Vehicle Device

FIG. 4 is a flowchart illustrating an example of processing of the on-vehicle device according to the first embodiment. The on-vehicle device 110 starts the processing of the on-vehicle device illustrated in FIG. 4, for example, when an accessory power source of the vehicle 10 is turned on (in a case of ACC-ON). Here, the following description is given on the assumption that evaluation regarding the safety of the driver's driving is evaluation on the driver's driving manner.

In step S401, the individual identification unit 303 identifies the driver driving the vehicle 10. For example, the individual identification unit 303 identifies the driver by performing face image authentication or the like by using the driver's face image captured by the in-vehicle camera 160.

In step S402, the approach detection unit 304 decides whether or not an emergency vehicle has approached the vehicle 10. For example, the approach detection unit 304 detects the approach of the emergency vehicle by means of a rotary lamp of the emergency vehicle detected from image data which is acquired by imaging the vicinity of the vehicle 10 by the image acquisition unit 302, a siren sound detected from sound data in the vicinity of the vehicle 10 which is acquired by the microphone 140, or the like. Alternatively, the approach detection unit 304 may detect the approach of the emergency vehicle based on vehicle information and the like acquired from another vehicle in the vicinity of the vehicle 10 by the vehicle-to-vehicle communication device 150.

In a case where the approach of the emergency vehicle is detected, the on-vehicle device 110 makes the processing proceed to step S403. On the other hand, in a case where the approach of the emergency vehicle is not detected, the on-vehicle device 110 repeatedly executes the process of step S402.

When the processing proceeds to step S403, the first decision unit 306 decides whether or not a point where the vehicle 10 is traveling is in the vicinity of an intersection. For example, the first decision unit 306 decides whether or not the point where the vehicle 10 is traveling is in the vicinity of an intersection by using positional information on the vehicle 10 which is acquired by the positional information acquisition unit 307 and road information which is stored in the map information DB 308.

In a case where the point where the vehicle 10 is traveling is in the vicinity of an intersection, the on-vehicle device 110 makes the processing proceed to step S404. On the other hand, in a case where the point where the vehicle 10 is traveling is not in the vicinity of an intersection, the on-vehicle device 110 makes the processing proceed to step S405.

When the processing proceeds from step S403 to step S404, the evaluation unit 310 sets an evaluation standard in a case where the vehicle is at an intersection to be described later, as an evaluation standard used for the evaluation of the driver's driving manner.

When the processing proceeds from step S403 to step S405, the first decision unit 306 decides whether or not the point where the vehicle 10 is traveling is on a one-way road. For example, the first decision unit 306 decides whether or not the point where the vehicle 10 is traveling is on a one-way road by using the positional information on the vehicle 10 which is acquired by the positional information acquisition unit 307 and the road information which is stored in the map information DB 308.

In a case where the point where the vehicle 10 is traveling is on a one-way road, the on-vehicle device 110 makes the processing proceed to step S406. On the other hand, in a case where the point where the vehicle 10 is traveling is not on a one-way road, the on-vehicle device 110 makes the processing proceed to step S407.

When the processing proceeds from step S405 to step S406, the evaluation unit 310 sets an evaluation standard in a case of one-way traffic to be described later, as an evaluation standard used for the evaluation of the driver's driving manner.

When the processing proceeds from step S405 to step S407, the evaluation unit 310 sets an evaluation standard in a normal case to be described later, as an evaluation standard used for the evaluation of the driver's driving manner.

In step S408, the evaluation unit 310 performs the evaluation of the driver's driving manner in accordance with the evaluation standards set in steps S404, S406, and S407. For example, the evaluation unit 310 performs the evaluation of the driver's driving manner in accordance with the evaluation standards set in steps S404, S406, and S407 in an evaluation standard 610 as illustrated in FIG. 6A. As described above, the evaluation unit 310 according to the embodiment performs the evaluation of the driver's driving manner by using different evaluation standards in accordance with decision results of the first decision unit 306.

FIG. 6A illustrates an example of the evaluation standard 610 used for the evaluation of the driver's driving manner.

In the example of FIG. 6A, the evaluation standard 610 includes information such as "large item", "small item", "case of intersection", and "normal case". The information in "large item" indicates evaluation items, such as hazard, deceleration, avoidance, and stop, which are used for the evaluation of a driving manner. The information in "small item" indicates evaluation contents and the like of each evaluation item.

The information in "case of intersection" indicates an evaluation standard 611 in a case where the vehicle is at an intersection. The information in "case of one-way traffic" indicates an evaluation standard 612 in a case of one-way traffic. The information in "normal case" indicates an evaluation standard 613 in a normal case other than the case of intersection and the case of one-way traffic.

The evaluation items and the evaluation standards which are included in the evaluation standard 610 illustrated in FIG. 6A are examples. For example, regarding the evaluation standards used for the evaluation of the driver's driving manner, some of the evaluation items (or evaluation standards) may be different from those of the evaluation standard 610 illustrated in FIG. 6A, as shown in an evaluation standard 620 illustrated in FIG. 6B.

FIG. 5 is a flowchart illustrating an example of a driving manner evaluation process according to the first embodiment. The process shows an example of the driving manner evaluation process executed in step S408 of FIG. 4.

In step S501, the determination unit 309 determines whether or not the vehicle 10 has flickered a hazard lamp, and notifies the evaluation unit 310 of determination results. For example, the determination unit 309 determines whether or not the vehicle 10 has flickered a hazard lamp by using traveling information acquired by the traveling information acquisition unit 305 when the approach of the emergency vehicle has been detected by the approach detection unit 304.

In step S502, the determination unit 309 determines whether or not the vehicle 10 has performed deceleration, and notifies the evaluation unit 310 of determination results. For example, the determination unit 309 determines whether or not the vehicle 10 has performed deceleration by using the traveling information (for example, speed information, acceleration information, and the like on the vehicle 10) which is acquired by the traveling information acquisition unit 305 when the approach of the emergency vehicle has been detected by the approach detection unit 304.

In step S503, the determination unit 309 determines whether or not the vehicle 10 has performed avoidance and determines contents of the execution of the avoidance, and notifies the evaluation unit 310 of determination results. For example, the determination unit 309 determines whether or not the vehicle 10 has performed avoidance by avoidance determination processing to be described later. In a case where avoidance has been performed, the determination unit 309 determines whether or not avoidance has been performed within an intersection and whether left-justified avoidance has been performed at the front of the intersection, as the contents of the execution of the avoidance.

In step S504, the determination unit determines whether or not the vehicle 10 has stopped, and notifies the evaluation unit 310 of determination results. For example, the determination unit 309 determines whether or not the vehicle 10 has stopped by using the traveling information (for example, speed information on the vehicle 10) which is acquired by the traveling information acquisition unit 305 when the approach of the emergency vehicle has been detected by the approach detection unit 304.

In step S505, the evaluation unit 310 performs the overall determination (evaluation) of the driver's driving manner by using the determination results notified from the determination unit 309 and the evaluation standards set in steps S404, S406, and S407 of FIG. 4. For example, in step S404 of FIG. 4, it is assumed that the evaluation standard 611 in the case of intersection as illustrated in FIG. 6A is set.

In this case, the evaluation unit 310 adds "1" to an evaluation score in a case where deceleration has been executed and does not perform the addition of an evaluation score in a case where deceleration has not been executed, in accordance with whether or not deceleration has been performed. The evaluation unit 310 adds "1" to an evaluation score in a case where avoidance has been executed and subtracts "1" from the evaluation score in a case where avoidance has not been executed, in accordance with whether or not avoidance has been performed. The evaluation unit 310 subtracts "2" from the evaluation score in a case where avoidance has been performed within an intersection and adds "1" to the evaluation score in a case where left-justified avoidance has been performed at the front of the intersection, in accordance with contents of the execution of the avoidance. The evaluation unit 310 adds "1" to the evaluation score in a case where stop has been performed and does not addition to the evaluation score in a case where stop has not been performed, in accordance with whether or not stop has been performed.

The evaluation unit 310 can set the evaluation score having been subjected to addition or subtraction, for example, by the above-described processing, as evaluation results on the driver's driving manner.

Referring back to FIG. 4, the description of the flowchart illustrating an example of the processing of the on-vehicle device will be continued.

In step S409, the transmission unit 311 transmits evaluation information including the identification information on the driver identified in step S401 and the evaluation results of the evaluation performed in step S408 by the evaluation unit 310 to the server device 100 through the communication controller 301.

Desirably, the on-vehicle device 110 executes the process of step S409 and then repeatedly executes the process of step S402 and the subsequent processes.

By the above-described processing, the on-vehicle device 110 evaluates the driver's driving manner when an emergency vehicle approaches the vehicle 10, and can notify the server device 100 of evaluation results.

Avoidance Determination Process 1

FIG. 7 is a flowchart illustrating an example of avoidance determination processing according to the first embodiment. The processing is an example of determination process in which the determination unit 309 determines whether or not the vehicle 10 has performed avoidance in step S503 of FIG. 5.

In step S701, the determination unit 309 acquires information on a steering angle from the traveling information on the vehicle 10 which is acquired by the traveling information acquisition unit 305.

In step S702, the determination unit 309 decides whether or not the size of the steering angle is equal to or greater than a threshold value. Here, regarding the threshold value, it is assumed that a value for deciding that the vehicle 10 has performed avoidance is set in advance.

In a case where the size of the steering angle is equal to or greater than the threshold value, the determination unit 309 determines that avoidance has been performed (execution of avoidance) in step S703. On the other hand, in a case where the size of the steering angle is not equal to or greater than the threshold value, the determination unit 309 determines that avoidance has not been performed (non-execution of avoidance) in step S704.

Although the above-described process is an example of the avoidance determination processing, the determination unit 309 similarly determines whether or not the flickering of the hazard lamp, deceleration, stop, or the like has been performed, by using the traveling information acquired by the traveling information acquisition unit 305.

The determination unit 309 may determine the flickering of the hazard lamp, deceleration, avoidance, stop, or the like by using image data acquired by imaging the vicinity of the vehicle 10 by the image acquisition unit 302.

Avoidance Determination Process 2

FIG. 8 is a flowchart illustrating another example of the avoidance determination processing according to the first embodiment. The processing is another example of determination processing in which the determination unit 309 determines whether or not the vehicle 10 has performed avoidance in step S503 of FIG. 5.

In step S801, the determination unit 309 acquires information on a steering angle from the traveling information on the vehicle 10 which is acquired by the traveling information acquisition unit 305.

In step S802, the determination unit 309 detects, for example, a white line on the left side of a road by using the image data acquired by imaging the vicinity of the vehicle 10 by the image acquisition unit 302.

In step S803, the determination unit 309 decides whether or not the size of the steering angle is equal to or greater than a threshold value. In a case where the size of the steering angle is not equal to or greater than the threshold value, the determination unit 309 determines that avoidance has not been performed in step S804. On the other hand, in a case where the size of the steering angle is equal to or greater than the threshold value, the determination unit 309 makes the processing proceed to step S805.

When the processing proceeds to step S805, the determination unit 309 decides whether or not the vehicle 10 has extended over the white line detected in step S802. In a case where the vehicle 10 has not extended over the white line, the determination unit 309 determines that avoidance (small) has been performed in step S806. On the other hand, in a case where the vehicle 10 has extended over the white line, the determination unit 309 determines that avoidance (large) has been performed in step S807.

As described above, the determination unit 309 may perform determination processing by using image data to be acquired by the image acquisition unit 302. The determination unit 309 may perform determination regarding avoidance by performing level classification into a plurality of levels in accordance with, for example, the magnitude of deceleration, the magnitude of avoidance, or the like.

Real-Time Processing of Server Device

FIG. 9A is a flowchart illustrating an example of real-time processing of the server device 100. The processing is an example of real-time processing executed when the server device 100 receives evaluation information from the on-vehicle device 110.

In step S911, the information management unit 322 of the server device 100 executes the process of step S912 and the subsequent processes when receiving the evaluation information from the on-vehicle device 110 through the communication controller 321.

In step S912, the information management unit 322 acquires identification information on the driver which is included in the evaluation information, and refers to evaluation results corresponding to the identification information on the driver which is stored in the driving manner DB 324, that is, evaluation results on the driver's driving manner.

In step S913, the information management unit 322 decides whether or not the number of evaluation results on the driver's driving manner which are stored in the driving manner DB 324 is equal to or greater than a predetermined number. Here, regarding the predetermined number, it is assumed that a sufficient number is determined in advance in order to decide the driver's driving manner, for example, in a case where an average value of the evaluation results on the driver's driving manner is calculated.

In a case where the number of evaluation results is equal to or greater than the predetermined number, the information management unit 322 overwrites the evaluation results included in the evaluation information received in step S911 to the oldest evaluation results, among the evaluation results on the driver which are stored in the driving manner DB 324, in step S914.

In a case where the number of evaluation results is not equal to or greater than the predetermined number, the information management unit 322 adds the evaluation results included in the evaluation information received in step S911 to the evaluation results on the driver which are stored in the driving manner DB 324, in step S915.

By the above-described processing, when the information management unit 322 receives the evaluation information from the on-vehicle device 110, the information management unit stores the latest data within the predetermined number, among the evaluation results on the driver, in the driving manner DB 324 to manage the data, based on the identification information on the driver which is included in the evaluation information.

Batch Processing of Server Device

FIG. 9B is a flowchart illustrating an example of batch processing of the server device 100. The processing is an example of batch processing executed by the server device 100, for example, for each predetermined period.

In step S921, the information management unit 322 of the server device 100 starts to execute the process of step S922 and the subsequent process in a case where a predetermined period elapses from the previous process.

In step S922, the information management unit 322 refers to (acquires) evaluation results (first evaluation results) on the driver in a predetermined period (first predetermined period) which are stored in the driving manner DB 324.

In step S923, the information management unit 322 calculates an average value of the evaluation results on the driver in the predetermined period which are referred to in step S922.

In step S924, the information management unit 322 decides whether or not there is a difference between the average value of the evaluation results on the driver in the predetermined period which are calculated in step S923 and an average value of the evaluation results (second evaluation results) on the driver before the predetermined period (second predetermined period). It is assumed that the information management unit 322 stores the average value of the evaluation results on the driver which is calculated in the past process in a storage unit such as the driving manner DB 324 to manage the stored average value.

In a case where there is no difference between the average value of the evaluation results in the predetermined period and an average value of the past evaluation results, the information management unit 322 terminates the batch processing. On the other hand, in a case where there is a difference between the average value of the evaluation results in the predetermined period and the average value of the past evaluation results, the information management unit 322 makes the processing proceed to step S925.

When the processing proceeds to step S925, the information management unit 322 stores the average value of the evaluation results which is calculated in step S923 in a storage unit, such as the driving manner DB 324, as evaluation results on the driver, instead of the average value of the past evaluation results which are stored in the storage unit and managed.

As described above, the information management unit 322 can maintain evaluation results on the safety related to the driver's driving in the latest state. In a case where there is no difference between the average value of the evaluation results in the predetermined period and the average value of the past evaluation results, the information management unit 322 can further reduce a load of updating processing of the information management unit 322.

In step S926, the information association unit 323 transmits the evaluation results on the driver which are stored in the storage unit by the information management unit 322 and identification information for identifying the driver to an insurance company (for example, the service providing system 330 or the like which is used by the insurance company) which provides an insurance service to the driver.

As described above, the insurance company providing an insurance service to the driver can give an incentive, such as a discount of a fee of the insurance service provided to the driver, to the driver in accordance with, for example, evaluation results on the driver's driving manner.

Second Embodiment

In the first embodiment, the on-vehicle device 110 performed the evaluation of the driver's driving manner by using, for example, the evaluation standard 611 in a case of intersection, the evaluation standard 612 in a case of one-way traffic, and the evaluation standard 613 in a normal case as illustrated in FIG. 6A, in accordance with a point where the vehicle 10 was traveling.

For example, when the vehicle 10 is waiting for the light to change at an intersection, the flickering of the hazard lamp may not be needed depending on a lane on which an emergency vehicle is traveling, such as a case where the emergency vehicle is passing through another lane different from the driver's own lane.

In a second embodiment, the on-vehicle device 110 decides whether or not the emergency vehicle is traveling on the driver's own lane or is traveling on another lane different from the driver's own lane, and performs the evaluation of safety related to the driver's driving by using evaluation standards varying depending on decision results.

Flow of Processing

Processing of On-Vehicle Device

FIG. 10 is a flowchart illustrating an example of processing of an on-vehicle device according to the second embodiment. Processes shown in steps S401, S402, and S409 among processes shown in FIG. 10 are the same as the processes according to the first embodiment illustrated in FIG. 4, and thus differences from the first embodiment will be mainly described.

When the processing proceeds from step S402 to step S1001, the second decision unit 312 decides whether the position of an emergency vehicle can be specified or is unclear, for example, by using image data acquired by imaging the vicinity of the vehicle 10 by the image acquisition unit 302. For example, the second decision unit 312 analyzes the image data obtained by imaging the vicinity of the vehicle 10, and decides that the position of the emergency vehicle is unclear in a case where the emergency vehicle, a rotary lamp of the emergency vehicle, or the like is not detected.

In a case where the position of the emergency vehicle is unclear, the on-vehicle device 110 makes the processing proceed to step S1002. On the other hand, in a case where the position of the emergency vehicle is not unclear, the on-vehicle device 110 makes the processing proceed to step S1003.

When the processing proceeds from step S1001 to step S1002, the evaluation unit 310 sets an evaluation standard in a case of unclearness which is an evaluation standard in a case where the position of the emergency vehicle is unclear, as an evaluation standard used for the evaluation of the driver's driving manner. For example, the evaluation unit 310 can apply the evaluation standard 610 as illustrated in FIG. 6A, as the evaluation standard in a case of unclearness.

When the processing proceeds from step S1001 to step S1003, the second decision unit 312 decides whether or not the position of the emergency vehicle is on the driver's own lane (whether or not the emergency vehicle is traveling on the same lane as that of the vehicle 10 or is traveling on a lane different from that of the vehicle 10). For example, the second decision unit 312 analyzes the image data obtained by imaging the vicinity of the vehicle 10 to detect an emergency vehicle, a rotary lamp of the emergency vehicle, and the like, and decides whether or not the emergency vehicle is traveling on the same lane as that of the vehicle 10 from a white line of a road, a traveling direction of the emergency vehicle, and the like.

In a case where the position of the emergency vehicle is on the driver's own lane, the on-vehicle device 110 makes the processing proceed to step S1004. On the other hand, in a case where the position of the emergency vehicle is not on the driver's own lane, the on-vehicle device 110 makes the processing proceed to step S1005.

When the processing proceeds from step S1003 to step S1004, the evaluation unit 310 sets an evaluation standard 1110 in a case of the driver's own lane as illustrated in, for example, FIG. 11A, as an evaluation standard used for the evaluation of the driver's driving manner.

In the example of FIG. 11A, the evaluation standard 1110 in a case of the driver's own lane includes information such as "large item", "small item", "case of intersection", and "normal case", similar to the evaluation standard 610 illustrated in FIG. 6A. In FIG. 11A, the information of "case of intersection" indicates an evaluation standard 1111 in a case of intersection in a case where the emergency vehicle is traveling on the same lane as that of the vehicle 10. The information of "case of one-way traffic" indicates an evaluation standard 1112 in a case of one-way traffic in a case where the emergency vehicle is traveling on the same lane as that of the vehicle 10. The information of "normal case" indicates an evaluation standard 1113 in a normal case in a case where the emergency vehicle is traveling on the same lane as that of the vehicle 10.

In the example of FIG. 11A, a marking standard different from the evaluation standard 610 illustrated in FIG. 6A is set in the evaluation standard 1110 in a case of the driver's own lane. For example, "timing" which is a small item is added to "deceleration" which is a large item of the evaluation standard 1110 in a case of the driver's own lane.

When the processing proceeds from step S1003 to step S1005, the evaluation unit 310 sets an evaluation standard 1120 in a case of another lane as illustrated in, for example, FIG. 11B, as an evaluation standard used for the evaluation of the driver's driving manner.

In the example of FIG. 11B, the evaluation standard 1120 in a case of another lane includes information such as "large item", "small item", "case of intersection", and "other than case of intersection". In FIG. 11B, the information of "case of intersection" indicates an evaluation standard 1121 in a case of intersection in a case where the emergency vehicle is traveling on a lane different from that of the vehicle 10. In FIG. 11B, the information of "other than case of intersection" indicates an evaluation standard 1122 in a case other than a case of intersection in a case where the emergency vehicle is traveling on a lane different from that of the vehicle 10.

As described above, in the embodiments, it is possible to decide whether the position of the emergency vehicle is on the driver's own lane or on another lane or is unclear by the second decision unit 312, and the on-vehicle device 110 can set an evaluation standard varying depending on decision results of the second decision unit 312.

In step S1006, the evaluation unit 310 performs the evaluation of the driver's driving manner in accordance with the evaluation standards set in steps S1002, S1004, and S1005. For example, in a case where the evaluation standard in a case of the driver's own lane is set in step S1004, the evaluation unit 310 performs the evaluation of the driver's driving manner by using the evaluation standard 1110 in a case of the driver's own lane as illustrated in FIG. 11A.

For example, the evaluation standard 1110 in a case of the driver's own lane illustrated in FIG. 11A includes the evaluation standard 1111 in a case of intersection, the evaluation standard 1112 in a case of one-way traffic, and the evaluation standard 1113 in a normal case. In this case, the evaluation unit 310 executes, for example, the processes shown in steps S403 to S407 of FIG. 4, and performs the evaluation of the driver's manner in accordance with the set evaluation standards.

In this case, the evaluation unit 310 can perform the evaluation of the driver's manner by using different evaluation standards in accordance with the decision result of the second decision unit and the decision results of the first decision unit.

Application Example

Although the embodiments have been described above, the disclosure is not limited to the above-described embodiments, and various modifications and changes can be made without departing from the scope of the disclosure.

For example, the functional configuration of the information processing system 1 illustrated in FIG. 3 is an example, and the information processing system 1 may have various functional configurations. For example, as illustrated in FIG. 12, the information management unit 322, the driving manner DB 324, and the like included in the server device 100 of FIG. 3 may be included in the on-vehicle device 110. In this case, the on-vehicle device 110 includes the information association unit 323 instead of the transmission unit 311 included in the on-vehicle device 110 illustrated in FIG. 3. As described above, the information processing system 1 can transmit evaluation results on safety related to the driving of the driver of the vehicle 10 to a service providing system even in a case where the server device 100 is not provided.

Similarly, at least some of the functional configurations included in the on-vehicle device 110 illustrated in FIG. 3 may be included in the server device 100.

The on-vehicle device 110 may include the individual identification unit 303 in a case where a driver driving the vehicle 10 is determined in advance, a case where a contract target for an insurance service provided by the service providing system 330 is based on units of vehicles rather than being based on units of drivers, and the like. In this case, the transmission unit 311 of the on-vehicle device 110 may transmit evaluation information including identification information on the driver which is stored in advance, identification information on the vehicle 10, and the like to the server device 100, together with the evaluation results of the evaluation unit 310.

What is claimed is:

1. An information processing system comprising:
an acquisition unit configured to acquire traveling information indicating traveling conditions of a first vehicle traveling on a road;
a determination unit configured to determine one or more driving operations of a driver driving the first vehicle by using the traveling information acquired when a second vehicle approaches the first vehicle;
an evaluation unit configured to perform evaluation of safety related to the driver's driving by using determination results of the determination unit; and
an updating unit configured to acquire first evaluation results of the evaluation unit during a first predetermined period to compare the first evaluation results with second evaluation results of the evaluation unit during a second predetermined period before the first predetermined period, and to update the second evaluation results based on comparison results,
wherein the updating unit updates the second evaluation results by an average value of the first evaluation results when there is a difference between the average value of the first evaluation results and the second evaluation results.

2. The information processing system according to claim 1, further comprising:
an individual identification unit configured to identify the driver; and
an information association unit configured to transmit the second evaluation results updated by the updating unit and information for identifying the driver to a service providing system that provides a predetermined service to the driver.

3. The information processing system according to claim 1, wherein:
the second vehicle includes an emergency vehicle; and
the evaluation results of the evaluation unit include evaluation of a driving manner when the emergency vehicle approaches the first vehicle.

4. The information processing system according to claim 1, wherein:
the traveling information includes information on the first vehicle according to the driver's driving operation, or image data obtained by imaging a vicinity of the first vehicle;
the one or more driving operations include flickering of a hazard lamp, deceleration, avoidance, or stop of the first vehicle; and
the evaluation unit performs evaluation of safety related to the driver's driving in accordance with whether the driver executes the one or more driving operations, when the second vehicle approaches the first vehicle.

5. The information processing system according to claim 1, further comprising:
- a positional information acquisition unit configured to acquire positional information indicating a position of the first vehicle; and
- a first decision unit configured to decide whether or not a point where the first vehicle is traveling is in a vicinity of an intersection and whether the point is on a one-way road, by using the positional information of the first vehicle and map information of the road,
- wherein the evaluation unit performs evaluation of safety related to the driver's driving by using evaluation standards varying depending on decision results of the first decision unit.

6. The information processing system according to claim 1, further comprising a second decision unit configured to decide whether the second vehicle is traveling on the same lane as that of the first vehicle or is traveling on a lane different from that of the first vehicle by using image data obtained by imaging a vicinity of the first vehicle,
- wherein the evaluation unit performs evaluation of safety related to the driver's driving by using evaluation standards varying depending on decision results of the second decision unit.

7. The information processing system according to claim 1, wherein:
- the information processing system includes an on-vehicle device mounted on the first vehicle; and
- the on-vehicle device includes the acquisition unit, the determination unit, the evaluation unit, and a transmission unit that transmits evaluation information including evaluation results of the evaluation unit and information for identifying the driver to an information processing device including the updating unit.

8. The information processing system according to claim 1, further comprising a server device configured to communicate with an on-vehicle device mounted on the first vehicle,
- wherein the server device includes
  - a receiver that receives evaluation information including evaluation results of the evaluation unit and information for identifying the driver,
  - the updating unit, and
  - an information association unit that transmits (i) the evaluation results on safety related to the driver's driving which are updated by the updating unit, and (ii) the information for identifying the driver to a service providing system that provides a predetermined service to the driver.

9. The information processing system according to claim 1, wherein the evaluation unit adds a score in accordance with predetermined evaluation standards in accordance with at least one of (i) whether or not the driver of the vehicle causes a hazard lamp to flicker, (ii) whether or not the vehicle decelerates, (iii) whether or not avoidance is appropriate, and (iv) whether or not the vehicle stops, to calculate evaluation on safety related to the driver's driving as an evaluation score.

10. An information processing device comprising:
- an acquisition unit configured to acquire traveling information indicating traveling conditions of a first vehicle traveling on a road;
- a determination unit configured to determine one or more driving operations of a driver driving the first vehicle by using the traveling information acquired when a second vehicle approaches the first vehicle;
- an evaluation unit configured to perform evaluation of safety related to the driver's driving by using determination results of the determination unit; and
- an updating unit configured to acquire first evaluation results of the evaluation unit during a first predetermined period to compare the first evaluation results with second evaluation results of the evaluation unit during a second predetermined period before the first predetermined period, and updates the second evaluation results based on comparison results,
- wherein the updating unit updates the second evaluation results by an average value of the first evaluation results when there is a difference between the average value of the first evaluation results and the second evaluation results.

11. An information processing method comprising:
by a computer,
- acquiring traveling information indicating traveling conditions of a first vehicle traveling on a road;
- determining one or more driving operations of a driver driving the first vehicle by using the traveling information acquired when a second vehicle approaches the first vehicle;
- evaluating safety related to the driver's driving by using determination results obtained in the determination;
- acquiring first evaluation results obtained in the evaluation during a first predetermined period, to compare the first evaluation results with second evaluation results obtained in the evaluation during a second predetermined period before the first predetermined period, and updating the second evaluation results based on comparison results; and
- updating the second evaluation results by an average value of the first evaluation results when there is a difference between the average value of the first evaluation results and the second evaluation results.

12. A non-transitory computer readable storage medium storing a program for causing a computer to execute the information processing method according to claim 11.

* * * * *